C. CONLON, DEC'D.
B. CONLON, ADMINISTRATRIX.
MOWER ATTACHMENT FOR AGRICULTURAL IMPLEMENTS.
APPLICATION FILED NOV. 6, 1919.
1,411,001. Patented Mar. 28, 1922.
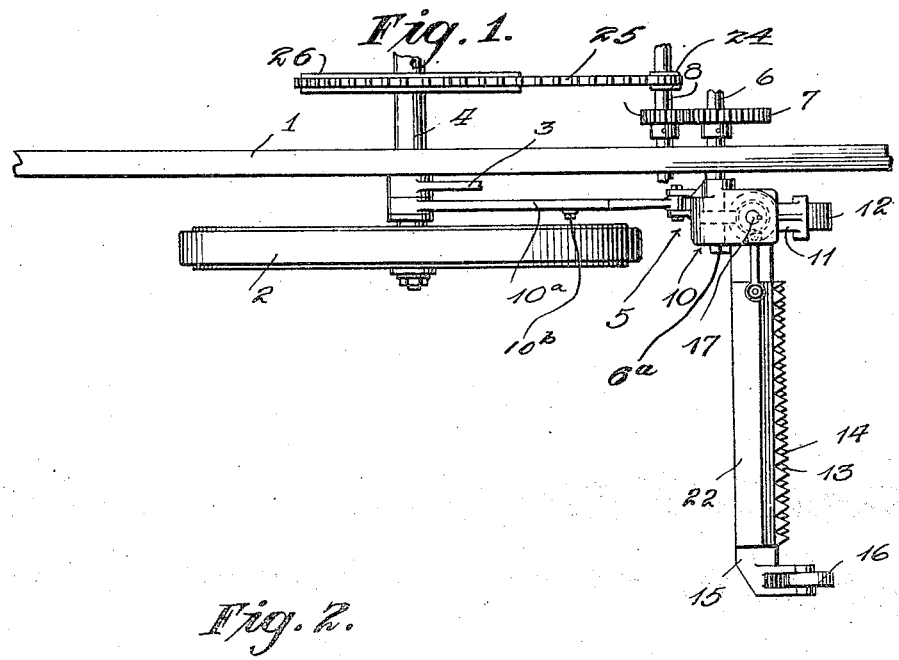
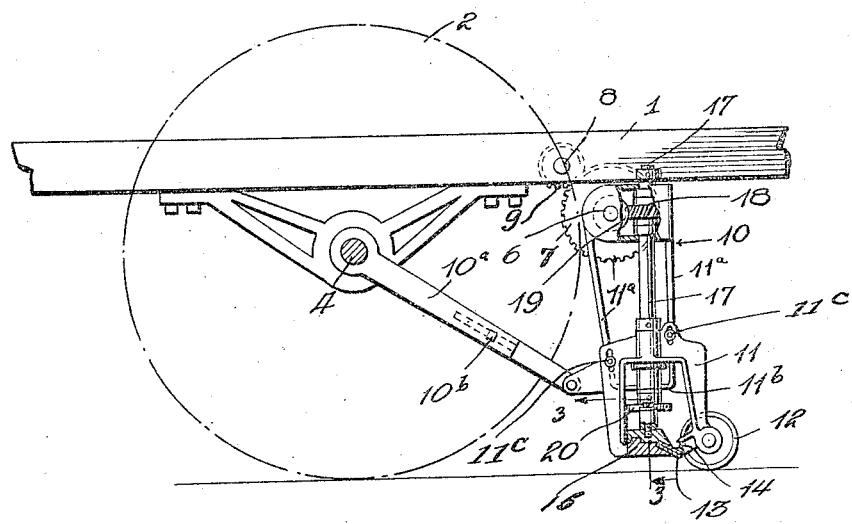
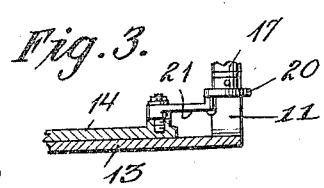
Inventor
Charles Conlon, deceas
by Barbara Conlon,
administratrix
Witnesses
W. C. Fielding.
S. M. McColl.
By Richard Bowen,
Attorney

UNITED STATES PATENT OFFICE.

CHARLES CONLON, DECEASED, LATE OF SPRINGFIELD, NEW YORK, BY BARBARA CONLON, ADMINISTRATRIX.

MOWER ATTACHMENT FOR AGRICULTURAL IMPLEMENTS.

1,411,001.   Specification of Letters Patent.   Patented Mar. 28, 1922.

Application filed November 6, 1919. Serial No. 336,204.

*To all whom it may concern:*

Be it known that CHARLES CONLON, deceased, late a citizen of the United States, and resident of Springfield, L. I., in the county of Queens and State of New York, United States of America, has invented new and useful Improvements in a Mower Attachment for Agricultural Implements, and that I, BARBARA CONLON, being duly constituted administratrix of the estate of CHARLES CONLON, do hereby declare the following to be a full, clear, and exact description of said invention, such as will enable others skilled in the art to which it appertains to make and use the same.

This invention relates to a mower attachment for agricultural implements and the object thereof is to provide a simple and efficient attachment of this character which may be easily applied to and removed from the machine in connection with which it is to be used, said machine being designed for use interchangeably with attachments of different kinds.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of a portion of the machine in connection with which this improved attachment is to be used, with the attachment shown applied.

Fig. 2 is a side elevation thereof with parts broken out and in section, and

Fig. 3 is a fragmentary sectional view showing the construction of a knife actuating means for a mower and taken on the line 3—3 of Fig. 2.

The attachment 5 constituting this invention is shown adjacent to a portion of a main supporting frame 1, mounted on traction wheels as 2, the axle 4 of which carries between the frame 1 and the wheel 2, braces or a link 3 which is designed to be connected at its front end with one of the side members of the frame structure, its rear end having a swinging or pivoted connection with the axle 4. Another link 10ª is mounted on the axle 4 between the bearing of link 3 and the hub of wheel 2 as is shown clearly in Fig. 1 and which constitutes a portion of the attachment now to be described.

A shaft 6 is arranged transversely of the frame 1 with one end projecting beyond one of the side members of said frame as shown in Fig. 1 and on which projecting end is mounted a transmission casing or bracket structure 10 constituting a portion of the attachment which will presently be described in detail. A gear wheel 7 is carried by shaft 6 and meshes with a pinion 9 carried by shaft 8, which latter is journalled in the frame 1, said shafts 6 and 8 being parallel with each other. By so arranging these shafts and connecting them the turning of shaft 8 which is accomplished by any suitable means will operate to turn shaft 6 for actuating the attachment in a manner presently to be described. As shown a sprocket wheel 24 is fixed to shaft 8 and a chain 25 connects it with a sprocket gear 26 on the axle 4 so that the turning of wheels 2 will operate the mower attachment.

The frame structure 10 which is fitted on the outstanding end of the shaft 6 has a finger bar support 11 and is connected by a link 10ª with the axle 4, said link being engaged with the support 11 so that said structure 10 is maintained at all times in the proper mounting.

The lower support or casting 11 of the structure 10 is adjustable vertically on the arms of a U-shaped guide 11ª, the upper ends of the arms being secured to the casing 10, while the lower ends are connected by a cross bar 11ᵇ which operates as a stop to prevent the accidental detachment of the support 11. Set screws 11ᶜ are shown for holding the support in adjusted relation to the guide 11ª. By adjusting the casting 11 the height of disposition of said casting with respect to the ground on which the implement is being propelled can be adjusted. A carrying wheel 12 supports the member 11 and holds said member at a proper height.

Stationary and movable knife blades or cutters 13 and 14 are mounted upon an arm 15 which extends from the movable support 11 and a carrying wheel 16 is mounted on the outer end of this arm to maintain the outer end of the arm at the same height as the inner end thereof.

A shaft 17 extends upward through the frame portions 10 and 11 and has a gear 18 at its upper end which meshes with a gear 19 on the shaft 6, it will thus be seen that when the shaft 6 is rotated through mechanism turning movement will be imparted to the shaft 17.

An eccentric disk 20 is carried by the lower end of the shaft 17 and a link 21 connects this disk 20 with the bar 22 of the movable cutter blade 14 and consequently when shaft 17 is rotated the desired reciprocation of the movable knife will be accomplished so that hay, grain, or other standing crops may be cut.

The link 10$^a$ is shown composed of two telescoping sections adjustably connected and held by a set screw 10$^b$ to provide for the change in the position of the member 11 and to maintain the same in adjusted position.

To apply the attachment constituting this invention, all that is necessary is to remove the nut 6$^a$ from the outer end of shaft 6 and pass the shaft through the bearing of the member 10, replace the nut 6$^a$ and then connect the link 10$^a$ with the axle 4 which may be accomplished by first removing the wheel 2 as is well understood. If desired, the section of link 10$^a$ carried by the axle 4 may remain normally on said axle and to connect it with the member 11 all that will be necessary is to telescopically engage the section carried by the member 11 with the section carried by the axle and tighten the set screw 10$^b$.

From the above description it will be seen that this attachment may be quickly applied to or removed from the machine in connection with which it is designed to be used, and when not in use it may be stored in any suitable place.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

What is claimed is—

1. The combination with a vehicle frame, a transmission housing, a vertical shaft journaled therein, means for driving said shaft, a mowing device, a support therefor slidably mounted upon the shaft, and means for preventing turning movement of the support upon the shaft.

2. The combination with a vehicle frame, a transmission housing, a vertical shaft journaled therein, means for driving said shaft, a mowing device, a vertical guide arranged at the side of the shaft, a support for the mowing device slidably mounted upon the shaft and guide, and means for retaining the support vertically adjusted.

3. In a mower attachment an inverted U-shaped mower support, a finger bar extending laterally from one arm thereof to support a cutting device, a wheel mounted in the outer end of said finger bar, a second wheel mounted in the outer arm of the inverted U-shaped support for supporting the inner end of the finger bar in spaced relation to the ground, and means for operating the cutting device.

4. In a mower attachment a frame, a support suspended therefrom and being vertically adjustable, cutting means carried by said support, and an adjustable brace rod connected to the support to form a brace, regardless of the adjustment of the cutter support.

5. In combination a vehicle frame, a transmission housing, a vertical shaft journaled therein, means for driving said shaft, a mowing device, a vertical U-shaped guide arranged at the side of the shaft, a support for the mowing device slidably mounted upon the shaft and arms of the guide, means for retaining the support vertically adjusted, and the bridging portion of the U-shaped guide serving to prevent excessive downward movement of the support.

In testimony whereof, I, BARBARA CONLON, administratrix of the estate of Charles Conlon, have hereunto set my hand in the presence of two subscribing witnesses.

BARBARA CONLON,
*Administratrix of Charles Conlon, deceased.*

Witnesses:
W. E. GILLEN,
JAMES E. KELLY.